(12) United States Patent
Ahmed (10) Patent No.: US 11,412,723 B2
(45) Date of Patent: Aug. 16, 2022

(54) CONNECTOR FOR A FLEXIBLE FISHING LURE WITH AN INTERCHANGEABLE SWIMBAIT

(71) Applicant: Fahad Ahmed, Santa Clara, CA (US)

(72) Inventor: Fahad Ahmed, Santa Clara, CA (US)

( * ) Notice: Subject to any disclaimer, the term of this patent is extended or adjusted under 35 U.S.C. 154(b) by 260 days.

(21) Appl. No.: 16/876,676

(22) Filed: May 18, 2020

(65) Prior Publication Data
US 2021/0352879 A1 Nov. 18, 2021

(51) Int. Cl.
*A01K 85/18* (2006.01)
*A01K 85/00* (2006.01)

(52) U.S. Cl.
CPC ............ *A01K 85/18* (2013.01); *A01K 85/029* (2022.02); *A01K 85/1837* (2022.02); *A01K 85/1881* (2022.02)

(58) Field of Classification Search
CPC ...... F16B 5/008; F16B 5/0028; Y10T 403/45; Y10T 403/54; Y10T 403/606; A01K 85/18; A01K 85/16; A01K 85/00; A01K 85/01; A01K 85/1837; A01K 85/1871
USPC ............ 43/42.09, 42.31, 42.39, 42.11, 42.15
See application file for complete search history.

(56) References Cited

U.S. PATENT DOCUMENTS

| | | | | |
|---|---|---|---|---|
| 5,522,170 A | * | 6/1996 | Cole | A01K 85/18 43/42.11 |
| 7,316,095 B1 | * | 1/2008 | Petner | A01K 85/16 43/42.22 |
| 8,316,576 B1 | * | 11/2012 | Brown | A01K 85/01 43/42.31 |
| 8,747,146 B2 | | 6/2014 | Brown et al. | |
| 8,769,782 B2 | | 7/2014 | Fujikawa | |
| 8,926,355 B2 | | 1/2015 | Heil et al. | |
| 8,950,105 B2 | * | 2/2015 | Thomas | A01K 85/01 43/42.31 |
| 9,266,591 B2 | * | 2/2016 | Lu | A63H 23/14 |
| 9,645,181 B2 | * | 5/2017 | Mimlitch, III | G01R 27/02 |
| 9,917,398 B1 | | 3/2018 | Ryland et al. | |
| 10,327,427 B2 | * | 6/2019 | Friedman | A01K 99/00 |
| 2002/0144451 A1 | * | 10/2002 | Kruger | A01K 85/18 43/42 |
| 2002/0194770 A1 | * | 12/2002 | King | A01K 85/00 43/42.24 |
| 2008/0104876 A1 | * | 5/2008 | Ito | A01K 85/16 43/42.47 |

(Continued)

FOREIGN PATENT DOCUMENTS

WO WO2015157558 A3 11/2015

*Primary Examiner* — Darren W Ark
*Assistant Examiner* — Zoe Tam Tran (57) ABSTRACT

A connector for a flexible fishing lure with an interchangeable swimbait is an apparatus used as a fastener for a modular fishing lure. The apparatus includes a lure body, a lure tail, a male connector, and a female connector. The lure body and the lure tail mirror the body and the tail of a live bait. The lure tail is made of soft-plastic material. The lure body is removably connected with the lure body with the male connector and the female connector. The male connector is integrated with the lure tail and the female connector is integrated with the lure body. Moreover, the lure tail is molded around a stabilizing frame and at least one panel of the male connector. The male connector latches with the female connector and is easily separated so that the lure tail may be interchanged.

12 Claims, 6 Drawing Sheets

(56) References Cited

U.S. PATENT DOCUMENTS

2012/0144726 A1* 6/2012 Parslow ................ A01K 85/02
                                                        43/37
2017/0000097 A1    1/2017 Thomas
2019/0229601 A1* 7/2019 Liao ....................... H02K 7/003

* cited by examiner

CONNECTOR FOR A FLEXIBLE FISHING LURE WITH AN INTERCHANGEABLE SWIMBAIT

FIELD OF THE INVENTION

The present invention generally relates to fishing accessories. More specifically, the present invention is connector for a flexible fishing lure with an interchangeable swimbait.

BACKGROUND OF THE INVENTION

Baits and lures are essential for fishing and vary depending on the type of fish being caught and the kind of body of water. Though live baits are preferred as live bait better attract fish, fishing lures are easier to keep and reuse. Fishing lures, however, may increase fishing time and make catching a fish much more difficult as typical fishing lures may be more distinguishable by fish as fake. In addition, each fishing lure may be limited to what type of fish they attract depending on the exterior appearance.

The present invention is a bait connect system that provides a realistic fishing lure that allows parts of the fishing lure to be interchangeable in order to attract a wider variety of fish. The present invention provides a structurally sound fishing lure so that the interchangeable tail does not separate throughout use. The present invention moves as if the present invention were a live bait swimming in a body of water. The present invention serves as a more universal fishing lure that accounts for varying types of fish and bodies of water.

DETAIL DESCRIPTIONS OF THE INVENTION

All illustrations of the drawings are for the purpose of describing selected versions of the present invention and are not intended to limit the scope of the present invention.

The present invention is a connector for a flexible fishing lure with an interchangeable swimbait that allows for a variety of fish-body and fish-tail combinations to remain securely connected with one another while in a body of water as bait. Furthermore, the present invention mimics the natural swimming movements of a real fish in a body of water. The present invention securely attaches a fish-tail with a fish-body and facilitates the separation of the fish-tail with the fish-body by a user. In order for the present invention to generate natural swimming movements with a modular fishing lure, the present invention comprises a male connector 11 and a female connector 27, seen in FIG. 2 and FIG. 3. The male connector 11 attaches a member of a flexible fishing lure to another member of a flexible fishing lure with the female connector 27. The male connector 11 comprises a plate 12, an anchor 15, a cantilever 16, and a lock tab 17. The plate 12 connects the anchor 15, the cantilever 16, and the lock tab 17 with the lure tail 8. The anchor 15 allows the cantilever 16 to flex with a push by the user. The cantilever 16 connects the lock tab 17 with the anchor 15. The lock tab 17 latches with the female connector 27. Moreover, the female connector 27 comprises a main body 28, a channel 29, a bumper 33, and a notch 34. The main body 28 receives and secures the male connector 11, and consequently defining an entire flexible fishing lure or simply a connection between members of a flexible fishing lure. The channel 29 allows the plate 12, the anchor 15, the cantilever 16, and the lock tab 17 to traverse into and out of the main body 28. The channel 29 comprises a first rim 30 and a second rim 31. The first rim 30 and the second rim 31 define the channel 29 in the main body 28. The bumper 33 stops the plate 12 from sliding through the channel 29. The notch 34 allows the lock tab 17 to securely latch into the main body 28.

Figure 1:
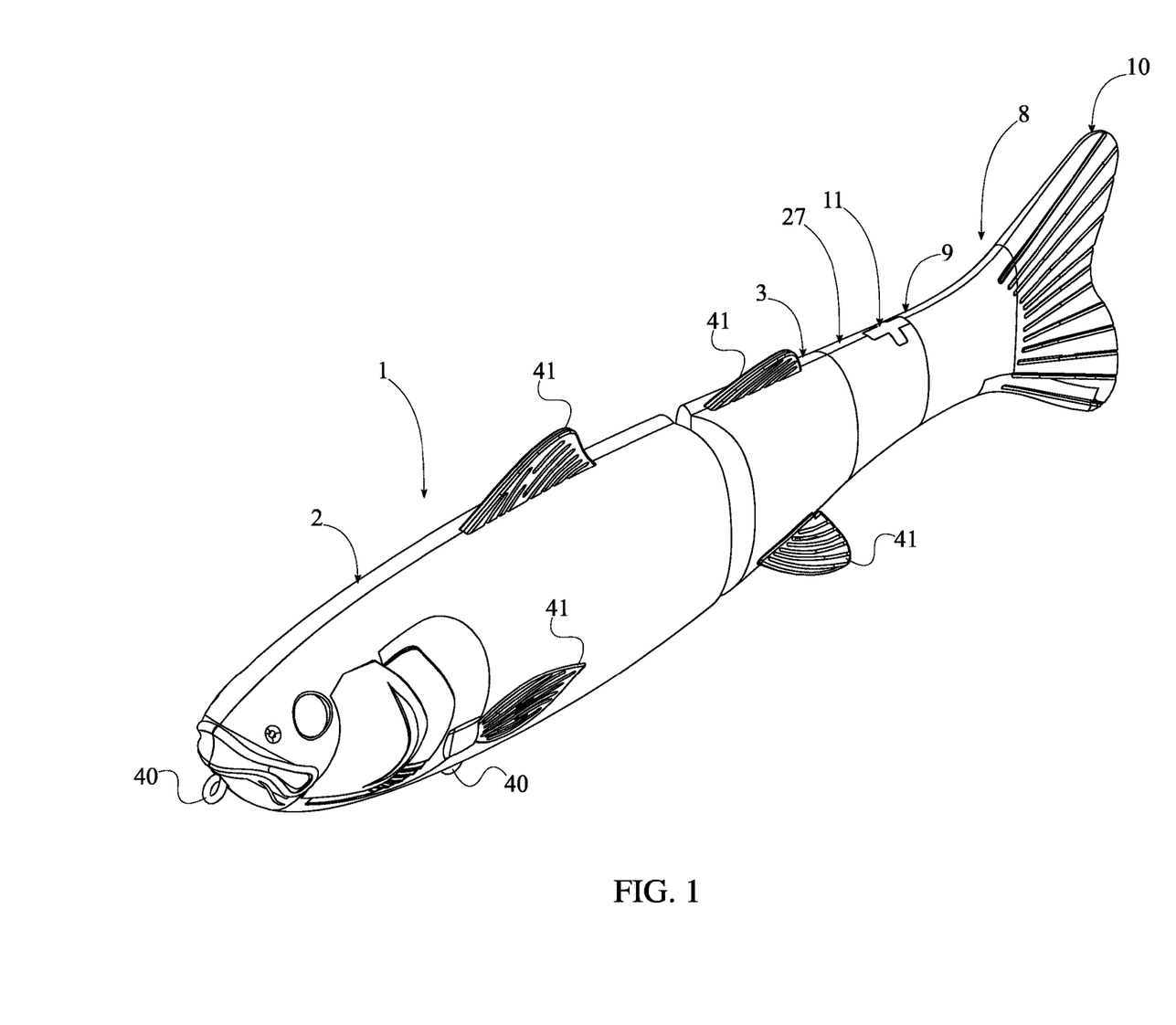
FIG. 1 is a perspective view of the present invention.
Figure 2:
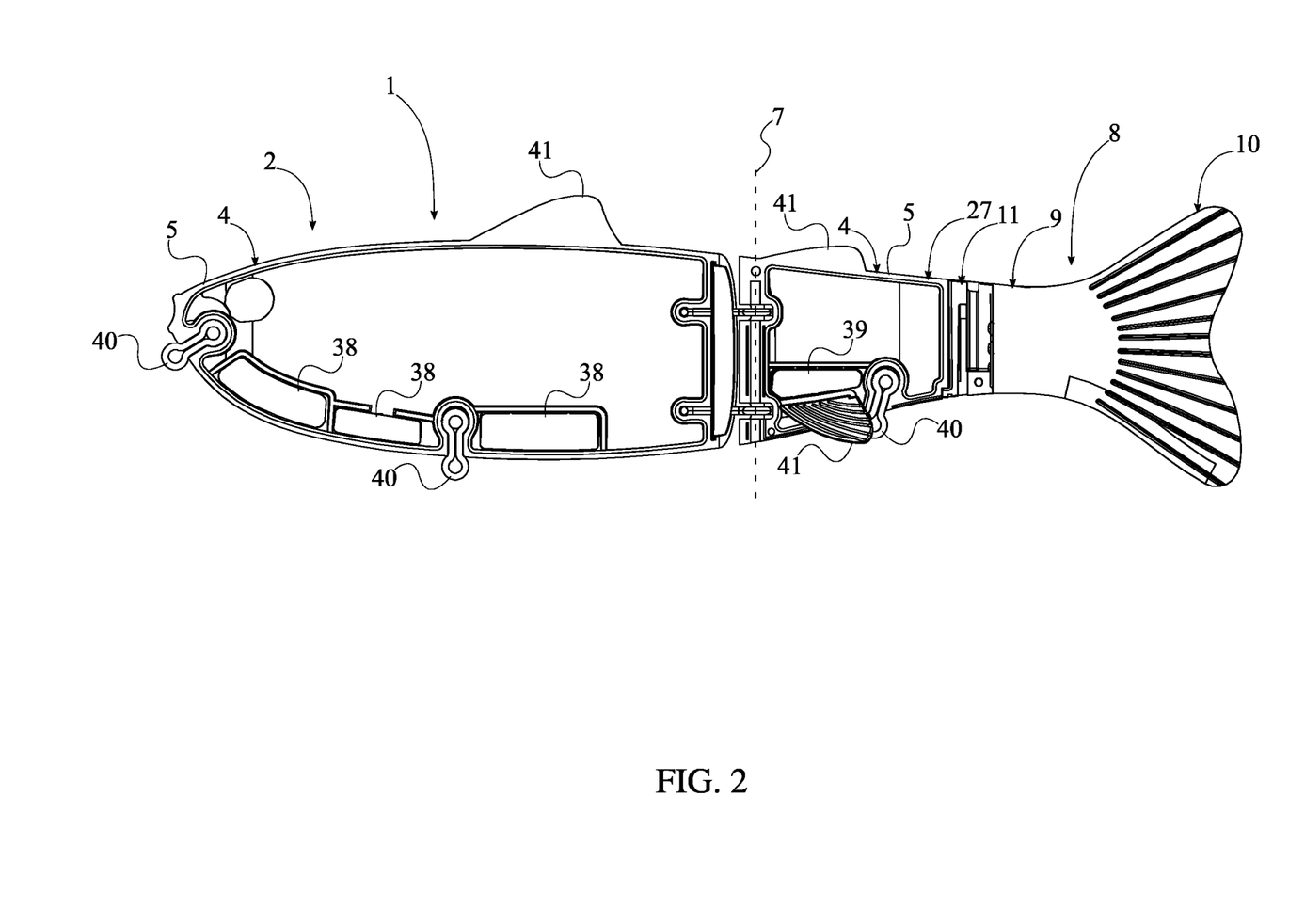
FIG. 2 is a side view of a first casing of a hollow body for a lure body of the present invention.

The overall arrangement of the aforementioned components securely connects variety of members of a flexible fishing lure with each other. As seen in FIG. 1 and FIG. 2, the male connector 11 securely attaches with the female connector 27 and remains flushed with the female connector 27 as the cantilever 16 is positioned parallel and offset from a first edge 13 of the plate 12. A second edge 14 of the plate 12 is positioned opposite the first edge 13 across the plate 12. The anchor 15 is fixed in between the cantilever 16 and the plate 12 so that the cantilever 16 may slightly hinge in order to traverse into the channel 29 and release the lock tab 17 from the notch 34. The lock tab 17 is terminally fixed with the cantilever 16, offset from the anchor 15. More specifically, the lock tab 17 is oriented away from the first edge 13. This arrangement of the lock tab 17 fastens the male connector 11 with the main body 28 of the female connector 27. The male connector 11 attaches with the main body 28 as the channel 29 traverses through the main body 28. More specifically, the first rim 30 is positioned opposite the second rim 31 about the main body 28. The bumper 33 is fixed within the channel 29, adjacent with the second rim 31. The arrangement of the bumper 33 within the channel 29 stops the male connector 11, specifically the plate 12 from slipping through the channel 29 and past the main body 28. The notch 34 traverses into the main body 28, adjacent with the second rim 31, and is positioned opposite the bumper 33 about the channel 29. The arrangement of the notch 34 with the main body 28 allows the lock tab 17 to securely latch with the main body 28. The members of a flexible fishing lure are interchangeable with one another as the male connector 11 is operatively coupled with the female connector 27, wherein the male connector 11 is used to engage and disengage with the female connector 27.

Figure 3:
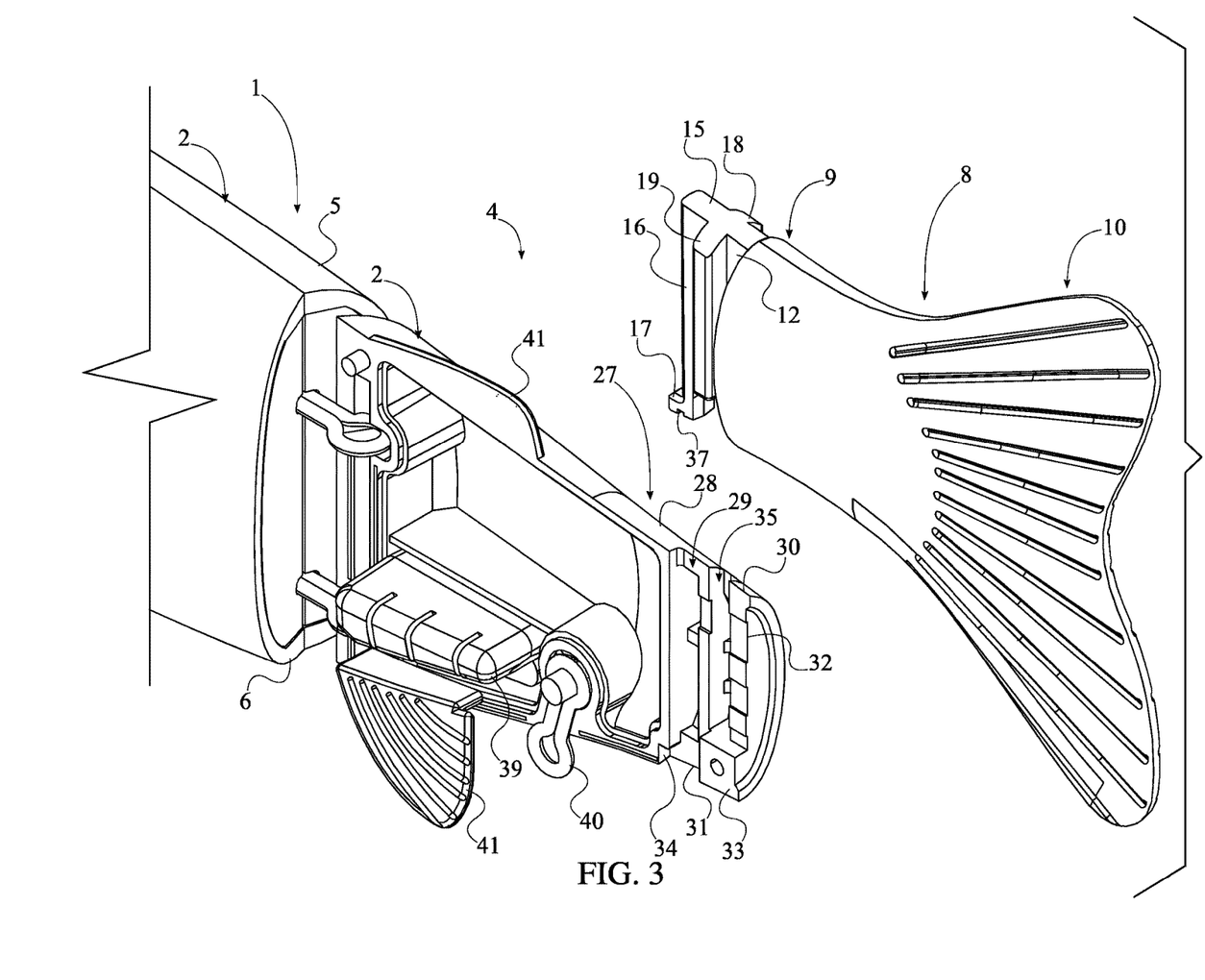
FIG. 3 is an exploded view of a female connector and a male connector of the present invention.
Figure 4:
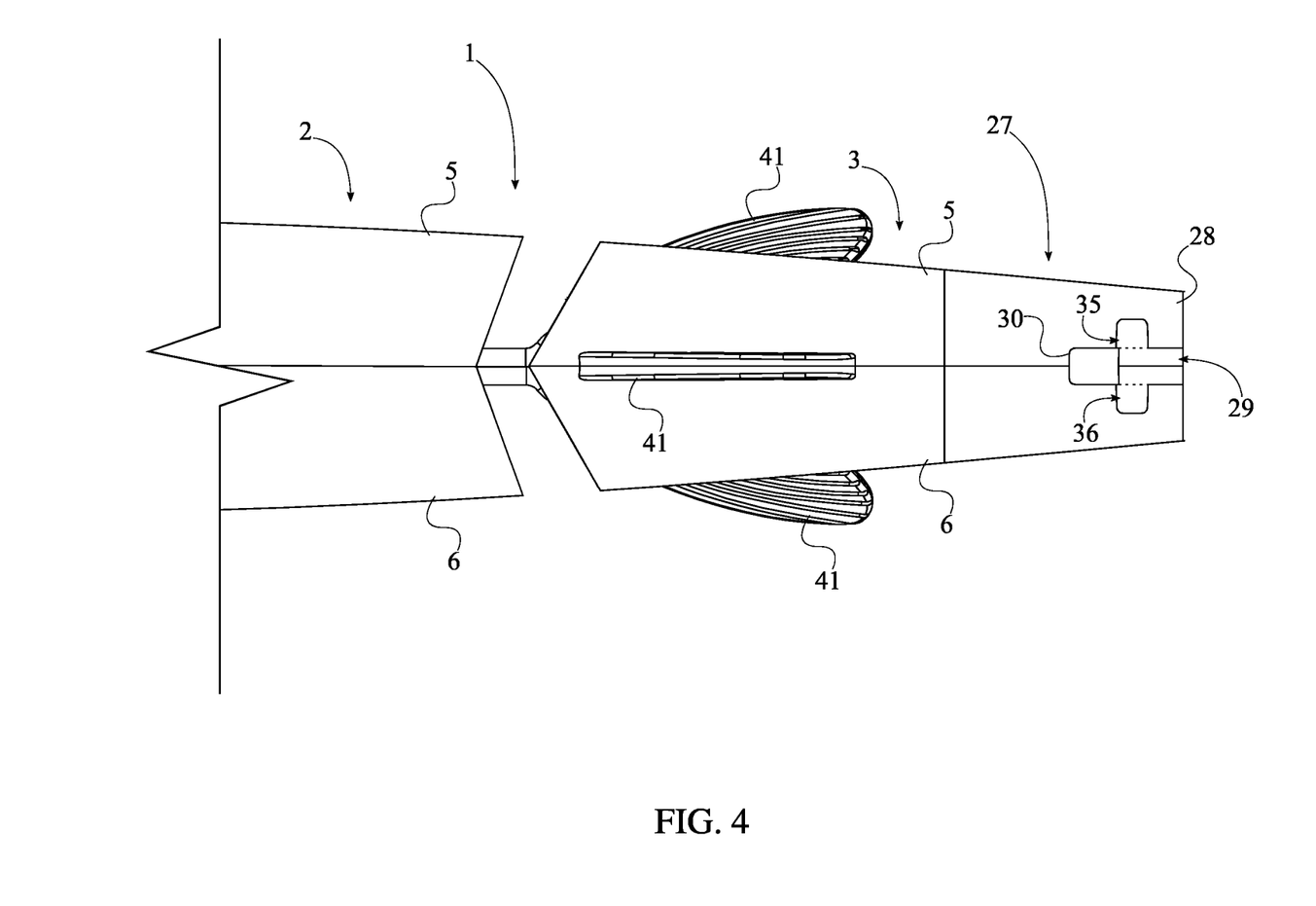
FIG. 4 is a top side view of the female connector and the lure body of the present invention.

More specifically, the plate 12, the cantilever 16, and the anchor 15 are slidably engaged within the channel 29, as seen in FIG. 2 and FIG. 3. The lock tab 17 is operatively coupled with the notch 34, wherein the lock tab 17 is used to engaged and disengage the notch 34. In order to connect desired members of a flexible fishing lure, male connector 11 is slid into the channel 29, by a user, with the lock tab 17 initially entering into the channel 29 and the plate 12 oriented parallel with the channel 29. The lock tab 17 snaps into the notch 34. In order to disconnect connected member of a flexible fishing lure, the lock tab 17 is pushed out of the notch 34 and towards the plate 12. The cantilever 16 slightly bends towards the plate 12 as well until the lock tab 17 slides into the channel 29. The male connector 11 is then free to slide out of the channel 29.

Figure 6:
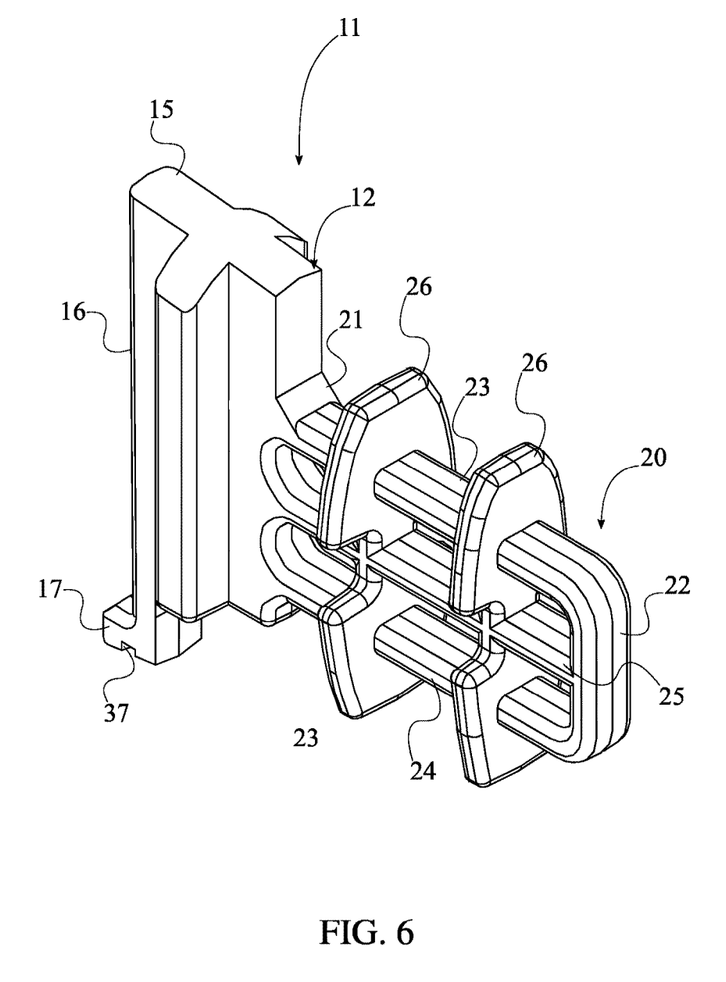
FIG. 6 is a rear perspective view of male connector of the present invention.

In order to reinforce the connection between the male connector 11 with the main body 28 of the female connector 27, the male connector 11 further comprises a first tab 18 and a second tab 19, seen in FIG. 3 and FIG. 6. The female connecter further comprises a first slot 35 and a second slot 36. The first tab 18 and the second tab 19, together, preserves the structural integrity of the plate 12 for the male connector 11 while engaged with the female connector 27. The first slot 35 and the second slot 36 allow the first tab 18 and the second tab 19, respectively, to traverse into the main body 28. The structural integrity of the plate 12 is preserved as the first tab 18 is fixed adjacent with the plate 12, and the second tab 19 is fixed adjacent with the plate 12, opposite the first tab 18 about the plate 12. More specifically, the first tab 18 and the second tab 19 are positioned perpendicular with the plate 12. The male connector 11 to freely slide into the main body 28 of the female connector 27 with the first tab 18 and the second tab 19, the first slot 35 and the second slot 36 traverses into the main body 28, adjacent with the first rim 30. Similarly, the first slot 35 and the second slot 36 are positioned perpendicular with the channel 29, and the first slot 35 is positioned opposite the second slot 36 about the channel 29. The connection between the male connector 11 and the second connector is further reinforced as the first tab 18 is slidably engaged within the first slot 35, and the second tab 19 is slidably engaged within the second slot 36.

Figure 5:
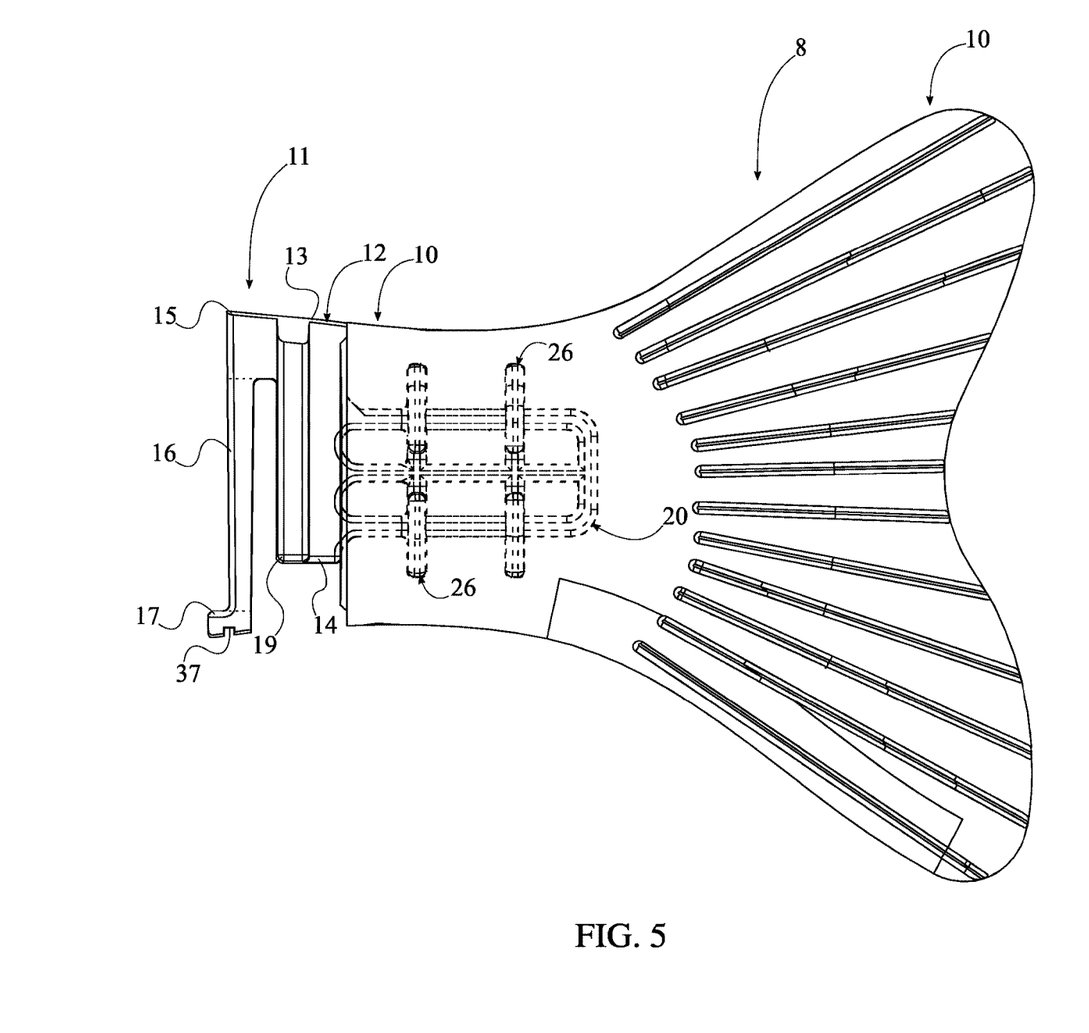
FIG. 5 is a schematic view of the male connector integrated into a lure tail of the present invention.

A flexible member of a flexible fishing lure is connected to a rigid member of a flexible fishing lure as the male connector 11 further comprises a stabilizing frame 29, and the channel 29 further comprises a third rim 32, seen in FIG. 3, FIG. 5, and FIG. 6. The stabilizing frame 29 allows the flexible member to be fixed with male connector 11 without inhibiting the connection between the male connector 11 and the female connector 27 as the stabilizing frame 29 is fixed along the second edge 14. More specifically, the stabilizing frame 29 is positioned coplanar with the plate 12, preserving hydrodynamic structure of the flexible fishing lure. The main body 28 of the female connector 27 accommodates the stabilizing frame 29 as the first rim 30 is intersected by the third rim 32. Moreover, the third rim 32 is positioned offset from the second rim 31. The stabilizing frame 29 is slidably engaged within the third rim 32 and is also integrated into the lure tail 8, providing a continuous exterior surface for the present invention with the lure body 1 and the lure tail 8.

The connection between a flexible member and a rigid member of a flexible fishing lure is further reinforced as the male connector 11 further comprises at least one panel 26, and the stabilizing frame 29 comprises a first lateral bar 21, a second lateral bar 22, a first elongated bar 23, a second elongated bar 24, and a connecting bar 25, seen in FIG. 5 and FIG. 6. The at least one panel 26 provides a better grip of the flexible member with the stabilizing frame 29. The first lateral bar 21, the second lateral bar 22, the first elongated bar 23, the second elongated bar 24, and the connecting bar 25 reinforces the structural integrity of the flexible member with the male connector 11. The arrangement of the stabilizing frame 29 with the at least one panel 26 prevents the flexible member from being easily torn or separated from the male connector 11 while traversing through a strong current or being bitten by a fish. The first lateral bar 21 is integrated along the second edge 14 of the plate 12. Moreover, the first lateral bar 21 is terminally fixed with the first elongated bar 23, the second elongated bar 24, and the connecting bar 25. The second lateral bar 22 is terminally fixed with the first elongated bar 23, the second elongated bar 24, and the connecting bar 25, opposite the first lateral bar 21 so that the rigid structure of the stabilizing frame 29 is maintained.

More specifically, the connecting bar 25 is positioned in between the first elongated bar 23 and the second elongated bar 24. The at least one panel 26 is integrated across the first elongated bar 23, the second elongated bar 24, and the connecting bar 25, further defining the rigid structure of the stabilizing frame 29. The at least one panel 26 is preferably positioned normal with the first elongated bar 23, the second elongated bar 24, and the connecting bar 25, providing the better grip for the lure body 1 with the male connector 11. Both, the stabilizing frame 29 and the at least one panel 26 are integrated into the flexible member.

The separation connected members of a flexible fishing lure is facilitated as the male connector 11 further comprises a finger-receiving groove 37, seen in FIG. 3, FIG. 5, and FIG. 6. The finger-receiving groove 37 provides leverage from a user to slide the lock tab 17 out of the notch 34. The finger-receiving groove 37 traverses into the lock tab 17 and is oriented away from the cantilever 16 so that the user may access the finger-receiving groove 37 while the lock tab 17 is engaged with the notch 34.

In the preferred embodiment of the present invention, a flexible member of a fishing lure and a rigid member of a flexible fishing lure, together, define a fishing lure that mirrors a live bait. In order to accurately replicate a live bait, the preferred embodiment of the present invention comprises a lure body 1 and a lure tail 8, seen in FIG. 1. The lure body 1 and the lure tail 8, together, creates the illusion of a live bait. The lure body 1 is a rigid shell with a contour and appearance as that of a body of a live bait. The lure tail 8 comprises a fixed end 9 and a free end 19. The fixed end 9 is attached to the lure body 1, and the free end 19 smoothly moves in a body of water as that of the tail of live bait. The lure tail 8 is preferably made of a soft-plastic material so that movement of the lure tail 8 accurately mimic that of live bait swimming in a body of water. A natural swimming form is provided with the present invention as he fixed end 9 is positioned opposite with the free end 19 about the lure tail 8, and the lure body 1 is positioned adjacent with the fixed end 9. The male connector 11 is also positioned adjacent with the fixed end 9 in order to connect the lure tail 8 to the lure body 1 with the female connector 27. The lure body 1 and the lure tail 8 preserve the appearance of a live bait as the fixed end 9 is mounted onto the plate 12, adjacent to the second edge 14. More specifically, the lure tail 8 is preferably molded around the stabilizing frame 29 so that the lure tail 8 remains securely fixed with the male connector 11 while having a flexible and pliable construction. The lure body 1 and the lure tail 8 appear to be a single, continuous bait. The main body 28 of the female connector 27 is terminally integrated with the lure body 1 so that the lure tail 8 is properly positioned with the lure body 1.

The present invention is able to more accurately mimic the movements of that of live bait with the flexible construction of the lure tail 8 as the lure body 1 comprises a head member 2 and a rear member 3, seen in FIG. 1 and FIG. 2. The head member 2 and the rear member 3 allows the lure body 1 to hinge as that of live bait swimming in a body of water. The head member 2 preferably comprises an exterior that mirrors that of a head of live bait. The head member 2 is positioned adjacent with the rear member 3 and is hingedly connected with the rear member 3. More specifically, a rotation axis 7 of the hinged connection between the head member 2 and the rear member 3 is positioned parallel with a dorsal/ventral axis of the lure body 1. The rotation axis 7 allows the head member 2 to move with the rear member 3 as that of live bait swimming with a tail of a live bait moving side-to-side instead of up-and-down like that of mammals. More specifically, the main body 28 is integrated into the rear member 3, preserving the appearance and structure as that of live bait.

In order to preserve the hydrodynamic structure of the present invention, the head member 2 and the rear member 3 each comprise a hollow body 4, seen in FIG. 2 and FIG. 3. Moreover, the hollow body 4 allows the present invention to remain buoyant in a body of water. The hollow body 4 preferably comprises a first casing 5 and a second casing 6. The first casing 5 and the second casing 6 define the rigid structure for the hollow body 4. The first casing 5 and the second casing 6 are bilaterally symmetrical to each other, preventing any water from getting into the hollow body 4 while in use. Furthermore, the first casing 5 is removably attached to the second casing 6 in order to access the interior of the hollow body 4, as well as the female connector 27 if necessary.

Depending on the type of fish the present invention is meant to attract, the present invention may need to be at varying depths with the water level. Furthermore, depending on the weight of the head member 2, the rear member 3, and the lure tail 8, the overall weight of the head member 2 and the rear member 3 needs to be adjusted such that the head member 2 and the rear member 3 remain parallel with the water surface. This balance allows the present invention to appear more realistic while moving through a body of water. The overall weight of the head member 2 is adjusted as the present invention comprises a plurality of first weights 38, and the overall weight of the rear member 3 is adjusted as the present invention comprises a plurality of second weights 39, seen in FIG. 2. The plurality of first weights 38 is mounted within the head member 2, and the plurality of second weights 39 is mounted within the rear member 3. The plurality of first weights 38 and the plurality of second weights 39 are not sliding around within the head member 2 and the rear member 3, respectively, therefore providing a smooth transition for the present invention through a body of water.

The present invention is securely connected to a fishing line and a fishing hook is easily connected with the present invention as the preferred embodiment of the present invention comprises a plurality of eye hooks 40, seen in FIG. 1 and FIG. 2. The plurality of eye hooks 40 is distributed about the lure body 1 and is externally connected with the lure body 1. In the preferred embodiment of the present invention, the present invention further comprises a plurality of fin-shaped features 41. The plurality of fin-shaped features 41 enhances the appearance of the lure body 1, more accurately mirroring the features of live bait. The plurality of fin-shaped features 41 also enhances the movement of the lure body 1 through the body of water to better mimic the swimming movements of live bait. The plurality of fin-shaped features 41 is distributed about the lure body 1 and is externally fixed with the lure body 1.

Although the invention has been explained in relation to its preferred embodiment, it is to be understood that many other possible modifications and variations can be made without departing from the spirit and scope of the invention as hereinafter claimed.

What is claimed is:

1. A connector for a flexible fishing lure with an interchangeable swimbait comprises:
  a male connector;
  a female connector;
  a lure tail;
  the male connector comprises a plate, an anchor, a cantilever, a lock tab, a stabilizing frame, and at least one panel;
  the female connector comprises a main body, a channel, a bumper, and a notch;
  the stabilizing frame comprises a first lateral bar, a second lateral bar, a first elongated bar, a second elongated bar, and a connecting bar;
  the channel comprises a first rim and a second rim;
  the cantilever being positioned parallel and offset from a first edge of the plate;
  a second edge of the plate being positioned opposite the first edge across the plate;
  the anchor being fixed in between the cantilever and the plate;
  the lock tab being terminally fixed with the cantilever, offset from the anchor;
  the lock tab being oriented away from the first edge;
  the channel traversing through the main body;
  the first rim being positioned opposite the second rim about the main body;
  the bumper being fixed within the channel, adjacent with the second rim;
  the notch traversing into the main body, adjacent with the second rim;
  the notch being positioned opposite the bumper about the channel; and
  the male connector being operatively coupled with the female connector, wherein the male connector is used to engage and disengage with female connector;
  the stabilizing frame being positioned coplanar with the plate;
  the first lateral bar being integrated along the second edge;
  the first lateral bar being terminally fixed with the first elongated bar, the second elongated bar and the connecting bar;
  the second lateral bar being terminally fixed with the first elongated bar, the second elongated bar and the connecting bar, opposite the first lateral bar;
  the connecting bar being positioned in between the first elongated bar and the second elongated bar;
  the at least one panel being integrated across the first elongated bar, the second elongated bar, and the connecting bar;
  the at least one panel being positioned normal with the first elongated bar, the second elongated bar, and the connecting bar; and,
  the stabilizing frame and the at least one panel being integrated into the lure tail.

2. The connector for a flexible fishing lure with an interchangeable swimbait as claimed in claim 1 comprises:
  the plate, the cantilever, and the anchor being slidably engaged within the channel; and,
  the lock tab being operatively coupled with the notch, wherein the lock tab is used to engage and disengage the notch.

3. The connector for a flexible fishing lure with an interchangeable swimbait as claimed in claim 1 comprises:
  the male connector further comprises a first tab and a second tab;
  the female connector further comprises a first slot and a second slot;
  the first tab being fixed adjacent with the plate;
  the second tab being fixed adjacent with the plate, opposite the first tab about the plate;
  the first tab and the second tab being positioned perpendicular with the plate;

the first slot and the second slot traversing into the main body, adjacent with the first rim;

the first slot and the second slot being positioned perpendicular with the channel;

the first slot being positioned opposite the second slot about the channel;

the first tab being slidably engaged within the first slot; and, the second tab being slidably engaged within the second slot.

4. The connector for a flexible fishing lure with an interchangeable swimbait as claimed in claim 1 comprises:

the channel further comprises a third rim;

the stabilizing frame being fixed along the second edge;

the stabilizing frame being positioned coplanar with the plate;

the first rim being intersected by the third rim;

the third rim being positioned offset from the second rim; and, the stabilizing frame being slidably engaged within the third rim.

5. The connector for a flexible fishing lure with an interchangeable swimbait as claimed in claim 1 comprises:

the male connector further comprises a finger-receiving groove;

the finger-receiving groove traversing into the lock tab; and, the finger-receiving groove being oriented away from the cantilever.

6. The connector for a flexible fishing lure with an interchangeable swimbait as claimed in claim 1 comprises:

a lure body;

the lure tail comprises a fixed end and a free end;

the fixed end being positioned opposite with the free end about the lure tail;

the lure body being positioned adjacent with the fixed end;

the male connector being positioned adjacent with the fixed end;

the fixed end being mounted onto the plate, adjacent to the second edge; and, the main body being terminally integrated with the lure body.

7. The connector for a flexible fishing lure with an interchangeable swimbait as claimed in claim 6 comprises:

the lure body comprises a head member and a rear member;

the head member being positioned adjacent with the rear member;

the head member being hingedly connected with the rear member;

a rotation axis of the hinged connection between the head member and the rear member being positioned parallel with a dorsal/ventral axis of the lure body; and, the main body being integrated into the rear member.

8. The connector for a flexible fishing lure with an interchangeable swimbait as claimed in claim 7 comprises:

the head member and the rear member each comprise a hollow body;

the hollow body comprises a first casing and a second casing;

the first casing and the second casing being bilaterally symmetrical to each other; and, the first casing being removably attached to the second casing.

9. The connector for a flexible fishing lure with an interchangeable swimbait as claimed in claim 7 comprises:

a plurality of first weights;

a plurality of second weights;

the plurality of first weights being mounted within head member; and, the plurality of second weights being mounted within rear member.

10. The connector for a flexible fishing lure with an interchangeable swimbait as claimed in claim 6 comprises:

a plurality of eye hooks;

the plurality of eye hooks being distributed about the lure body; and, the plurality of eye hooks being externally connected with the lure body.

11. The connector for a flexible fishing lure with an interchangeable swimbait as claimed in claim 6 comprises:

a plurality of fin-shaped features;

the plurality of fin-shaped features being distributed about the lure body; and, the plurality of fin-shaped features being externally fixed with the lure body.

12. The connector for a flexible fishing lure with an interchangeable swimbait as claimed in claim 6 comprises, wherein the lure tail is made of a soft-plastic material.

* * * * *